United States Patent
Skowronski (10) Patent No.: US 10,305,962 B1
(45) Date of Patent: May 28, 2019

(54) UNIT TESTING CLIENTS OF WEB SERVICES

(71) Applicant: EMC Corporation, Hopkinton, MA (US)

(72) Inventor: Andrew Skowronski, Hudson (CA)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 190 days.

(21) Appl. No.: 14/983,966

(22) Filed: Dec. 30, 2015

(51) Int. Cl.
- *G06F 15/173* (2006.01)
- *H04L 29/08* (2006.01)
- *H04L 29/06* (2006.01)
- *H04L 12/26* (2006.01)

(52) U.S. Cl.
CPC ............ *H04L 67/025* (2013.01); *H04L 43/50* (2013.01); *H04L 67/14* (2013.01); *H04L 67/145* (2013.01); *H04L 67/42* (2013.01)

(58) Field of Classification Search
CPC ....... H04L 67/025; H04L 43/50; H04L 67/14; H04L 67/145; H04L 67/42
USPC .......................... 709/224, 223, 217, 218, 219
See application file for complete search history.

(56) References Cited

U.S. PATENT DOCUMENTS

| | | | | |
|---|---|---|---|---|
| 7,315,807 | B1* | 1/2008 | Lavallee | H04L 41/145 703/21 |
| 2005/0021276 | A1* | 1/2005 | Southam | H04L 41/50 702/122 |
| 2005/0038836 | A1 | 2/2005 | Wang | |
| 2013/0145351 | A1* | 6/2013 | Tunik | G06F 9/4443 717/135 |
| 2014/0149358 | A1 | 5/2014 | Aphale | |
| 2014/0359581 | A1* | 12/2014 | Soshin | G06F 11/3692 717/126 |
| 2016/0119209 | A1* | 4/2016 | Rosengarten | H04L 43/0817 709/224 |

OTHER PUBLICATIONS

U.S. Appl. No. 14/984,163, filed Dec. 30, 2015, Andrew Skowronski.
U.S. Appl. No. 14/984,163, filed Jan. 31, 2018, Restriction Requirement.
U.S. Appl. No. 14/984,163, filed May 11, 2018, Office Action.

\* cited by examiner

*Primary Examiner* — Liang Che A Wang
*Assistant Examiner* — Kaylee J Huang
(74) *Attorney, Agent, or Firm* — Workman Nydegger (57) ABSTRACT

In one example, a method for testing client operation includes transmitting an interface call, intercepting the interface call with a simulated service, and determining a correct response to a predicted network call. Next, the interface call is passed from the simulated service to an actual service that prepares a network request based on the interface call. The network request is correlated with an expected server response and the server interface response compared with the correct response to determine whether the client is operating properly.

18 Claims, 4 Drawing Sheets

UNIT TESTING CLIENTS OF WEB SERVICES

RELATED APPLICATIONS

This application is related to U.S. patent application Ser. No. 14/984,163, entitled BACKUP CLIENT AGENT, filed the same day herewith, and incorporated herein in its entirety by this reference.

FIELD OF THE INVENTION

Embodiments of the present invention generally clients that interface with web services. More particularly, at least some embodiments of the invention relate to systems, hardware, computer-readable media, and methods directed to the implementation and use of test methods and a test environment for testing proper client operation in connection with network-based services.

BACKGROUND

Client computing systems, also referred to simply as clients, may operate in connection with a variety of both local programs and services as well as with network-based services. The individual services, particularly network-based services, may change frequently as revisions are issued. As well, the mix of services available to the client may change from time to time. Consequently, some reprogramming of the client may be necessary to accommodate changes such as these.

When reprogramming however, there is always a possibility that the reprogrammed client may not operate correctly in connection with the new and modified services. Thus, it is useful to be able to test the interaction of the client with a service, or services, to ensure proper operation before bringing the client online with the new or modified service. However, testing of client interactions, particularly interactions with network-based services, can present a number of challenges.

For example, for clients involved in critical processes such as data backup and restore, typical testing schemes may not be sufficiently robust to fully exercise the client. That is, the testing schemes may address only a relatively small number of possible circumstances and client responses. As such, typical testing schemes may provide little assurance of reliable performance of the client over a wide range of conditions and responses from the services.

As another example, the service or services with which the client is expected to interact may not run reliably at all times. Thus, there may be little or no assurance that test results obtained concerning the interaction of the client with those services are accurate or useful if all the testing is performed on a stable test network.

In light of considerations such as those noted above, and others in the art, it would be useful to provide systems, methods and devices that enable testing of client interaction with network-based services. As well, it would also be useful to be enable such testing without the client actually interacting with those network-based services. Further, it would be useful to be able to test client interaction with network-based services without the use of a network connection. Furthermore, it would be useful to be able to test the lower level client code that is dedicated to communicating with the service, rather than bypassing those components when running tests. As well, it would be useful to be able to test the reactions of the backup client to problems, malfunctions and other conditions in the network-based services. Finally, it would be useful to provide a testing environment for evaluating the client interaction with network-based services.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally concern systems, hardware, computer-readable media, and methods directed to the implementation and use of test methods and a test environment for client systems and software. Embodiments of the invention can be employed, for example, in connection with a variety of network-based services, such as cloud services for example, but the scope of the invention is not limited to such services and environments. At least some embodiments are particularly useful in connection with backup and restore processes involving one or more clients and a cloud storage platform.

Where backup and restore processes are involved, embodiments of the invention can be employed in connection with any type of data. As used herein, the term 'data' is intended to be construed broadly and includes, by way of example and not limitation, data blocks, atomic data, chunks, segments, emails, objects, files, blocks, file structures, directories, volumes, and any group of one or more of the foregoing. The data can be of any type, and the scope of the invention is not limited to any particular type, or types, of data.

As well, it should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection.

In at least some embodiments, a testing environment is provided that simulates the structure and operation of a network-based service, or services, with which a client may interact. Such services can be cloud-based services and may, in some embodiments at least, relate to backup and/or restore processes performed in whole or in part by a client. In such instances, the client may consist of, or comprise, a backup client agent. Correspondingly, the services accessed by the client may include, for example, an authorization service, a catalog service, a command and control service, a configuration service, and a restore service. These services may each operate autonomously.

In at least some embodiments, the client can generally be structured into different components of code, each of which is responsible for performing different aspects of client operations. In some embodiments, certain components of the client will be involved in communicating with cloud-based services, such as by way of standard Internet protocols and conventions. Such components are referred to herein as service wrappers and those components enable other components of the client to make use of those services by offering an interface to that service that is represented in the native language of that the client, examples of which include, but are not limited to, C++, Python or Java.

The testing environment can be implemented partly, or completely, within a client, or clients, and can be specific to the service or group of services with which the particular client interacts. Thus, testing processes can be performed in the testing environment without the use or need for any connection between the client and the network from which the actual network-based services are provided to the client.

Generally, the test environment can include one or more tests, each of which can be referred to as a unit test. Some unit tests will be specific to a service wrapper within that client that interacts with a specific service. Thus, testing of the client can be performed at a useful level of granularity. Unit tests can be added to or removed from the testing environment as changes occur to the group of services with which the client interacts. Testing can also be performed at a higher level basis and is not confined to implementation at the service wrapper level. For example, a unit test can be employed that tests an entire backup process or an entire restore process.

As well, the unit tests can be performed, automatically in some embodiments, whenever changes are made to code at the client. Thus, the testing environment is well suited to quickly and effectively provide useful feedback concerning the operation of the client.

With regard to its operation, the test environment and unit tests simulate one or more services with which the client interacts, or is expected to interact. For example, a client may issue any of an endless variety of interface calls pertaining to operations that are to be performed by that client. Each interface call will have an associated network call that would normally be transmitted to the service. By way of illustration, a client performing a restore process may request that a particular file be downloaded from a server. This request can start with an interface call to the service wrapper, and the interface call would in turn be translated by the service wrapper into a network call that is transmitted to the service. A simulation of that interface call can be issued by a unit test and then received by a mock implementation of the service wrapper to which the interface call is directed.

For the simulated interface call, the mock service wrapper implementation is aware of, or is able to determine, the response that would be issued by the actual service to which the associated network call was directed. The mock service can then prepare that response and save that response in a rules database. After this has been completed, the mock service can pass the interface call to the real service wrapper which is being tested. The client code prepares a request based on the simulated call received from the mock service wrapper and then sends that request to the object which is responsible to communicate with the network. The object then finds the response to the request in the rules database and returns the response. The simulated network call is not transmitted to, nor received by, the actual service itself. The service wrapper code interprets the network response and prepares a response that would be understood by the client, for example a C++ data structure. If the response prepared by the object does not match the response expected by the test, then the test fails. On the other hand, if the response prepared by the object matches the response expected by the test, then the test passes.

Advantageously then, the response of a service to a client call can be simulated completely within the client. As well, no network connection is required for the testing process.

A. Example Operating Environments

In general, embodiments of the invention may include and/or be implemented in an operating environment in which one or more clients access one or more network-based services. In some more particular embodiments, the various clients and/or other devices generate and/or cause the generation of data that is desired to be backed up and subsequently restored, although the scope of the invention is not limited to such particular embodiments.

Figure 1:
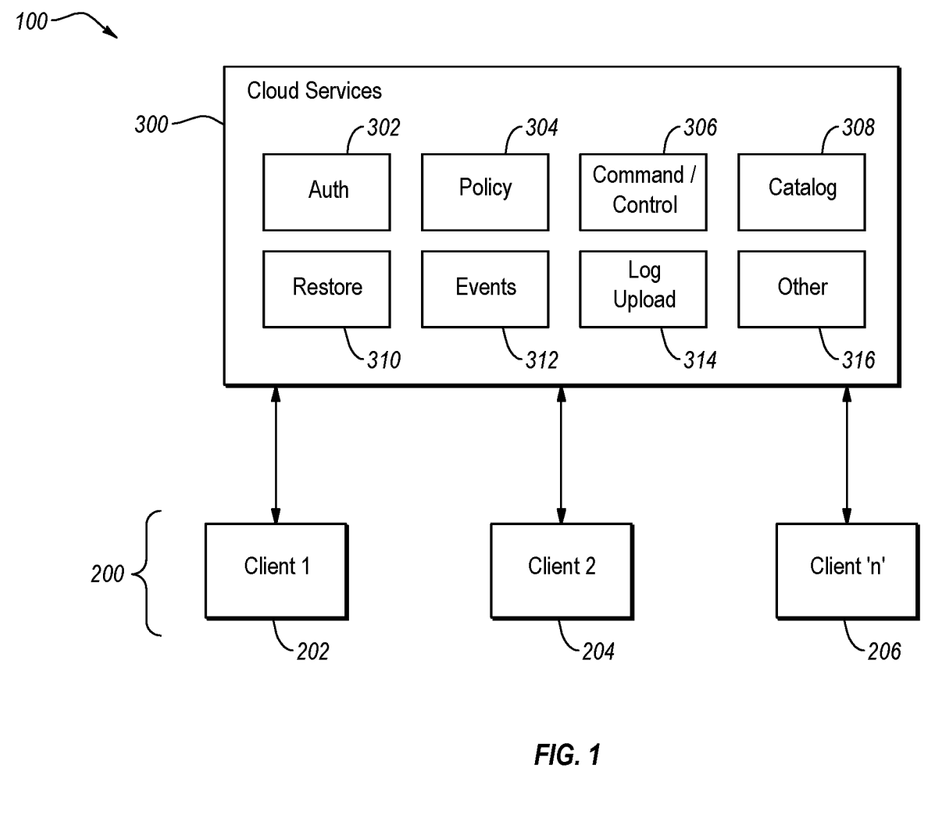
FIG. 1 is directed to aspects of an example operating environment for at least some embodiments.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, the Internet, or any other networked configuration. Moreover, the operating environment 100, or any group of one or more of its elements, may comprise, form an element of, or constitute, a cloud computing environment. The operating environment 100 may include various devices including servers and other computers that are interconnected. The operating environment 100 may employ a variety of communication media, such as hardwire, optical, wireless, or some combination thereof.

As indicated in FIG. 1, the example operating environment 100 includes a plurality of clients 200, such as clients 202 (client 1), 204 (client 2) and 206 (client 'n') that each communicate with one or more network-based services, which can take the form in some embodiments of a suite of cloud services 300, discussed in further detail elsewhere herein. There can be any number 'n' of clients 200 in the operating environment 100. Further details concerning an example client configuration are provided below in the discussion of FIG. 3.

In some embodiments, the example operating environment 100 may include, or communicate with, a storage platform (not shown), such as a cloud storage platform for example. One example of such a cloud storage platform is the Amazon Simple Storage Service (Amazon S3) platform, although any other cloud storage platform could be employed. Other example platforms include OpenStack Swift, EMC Corp. Atmos, Centera CAS, and Hadoop HDFS.

With continued reference to FIG. 1, the cloud services 300 can, in general, comprise, or consist of, any network-based services that may be accessed by one or more of the clients 200. As some embodiments of the invention may involve clients configured to perform backup and/or restore processes, the cloud services 300 may correspondingly include one or more services that can be used in connection with such processes. Thus, example cloud services 300 may include an authorization service 302, a policy service 304, a command and control service 306, a catalog 308, a restore service 310, an events service 312, and a log upload service 314. More generally however, the cloud services 300 can include any other service 316 that can be accessed by a client over a network connection, and each of those services may be hosted by a different respective provider. Further details concerning some of the aforementioned services are set forth in the application identified herein in the 'Related Applications' section. One or more of the cloud services 300 may, or may not, be related to one or more other of the cloud services 300.

Finally, with respect to the example operating environment 100, it should be noted the clients 200 and/or cloud services 300 can consist of, or comprise, one or more servers. It is not required that the server be any particular type of server. Moreover, any of the aforementioned components may be physical machines, virtual machines (VM), combinations of physical machines and virtual machines, and/or any other suitable type of device.

B. Example Host Configuration

Figure 2:
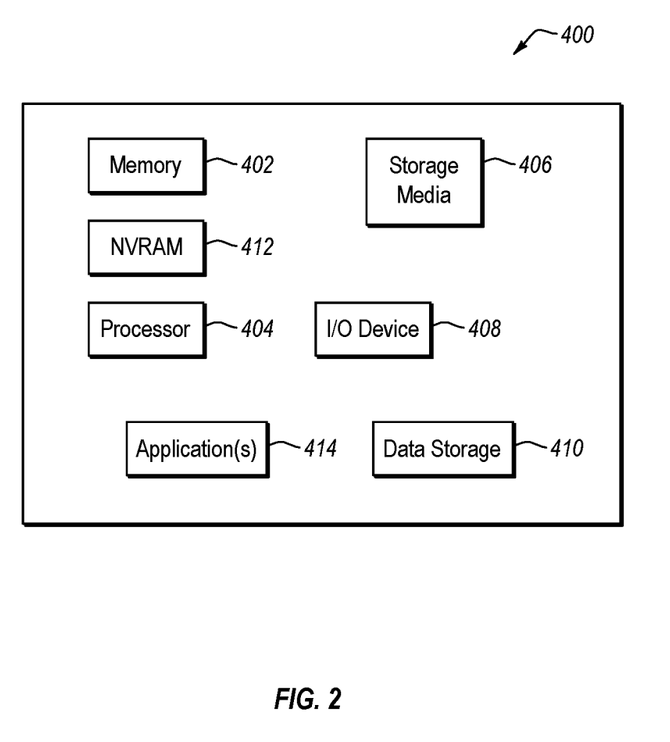
FIG. 2 is directed to an example host configuration.

With reference briefly to FIG. 2, one or more of clients 200 and the cloud services 300 can consist of, comprise, or take the form of, one or more physical computing devices, one example of which is denoted at 400 in FIG. 2. In the example of FIG. 2, the computing device 400 includes a memory 402, one or more hardware processors 404, non-transitory storage media 406, I/O device 408, data storage 410, and random access memory (RAM) such as NVRAM 412. As well, one or more applications 414 are provided that comprise executable instructions. Such executable instructions can take the form, for example, of any one or more of a backup application, a backup client agent, a client management application, an appliance agent, a deduplication application, and a distributed filesystem application.

C. Example Client Architecture

Figure 3:
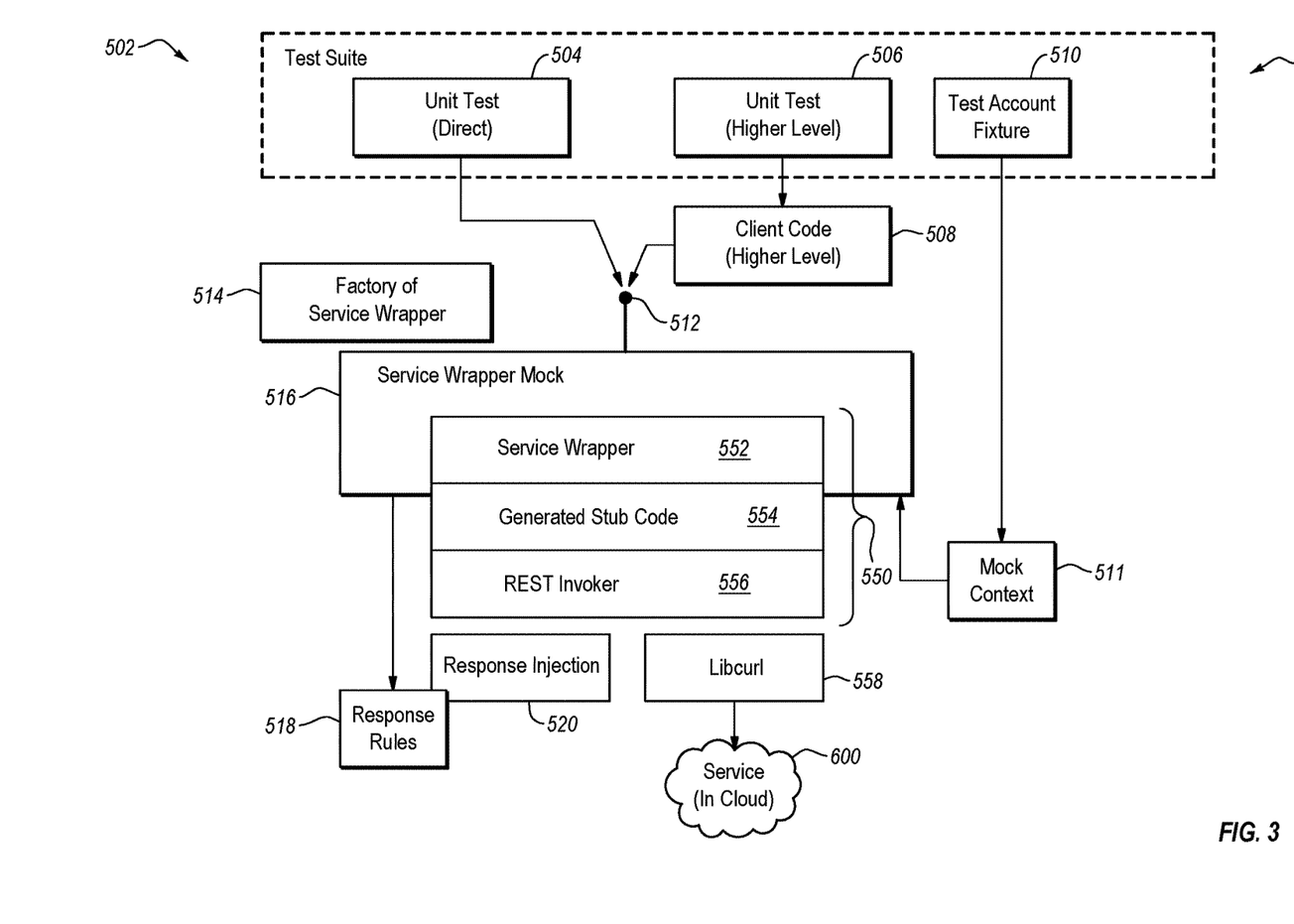
FIG. 3 is directed to an example client architecture.

With reference now to FIG. 3, details are provided concerning a client architecture, one example of which is denoted generally at 500. In general, each network-based service that may be accessed by the client is encapsulated behind an interface such that both a real service wrapper and a mock implementation of that service wrapper is provided. In order to exercise the range of operations of the client, each mock implementation simulates an actual server by generating HTTP responses on demand. The mock implementation can then inject the generated HTTP responses in place of real web service communications, and the operation of the client evaluated. All of this may be accomplished within the client architecture 500 without the need for network communications between the client and the network-based services with which the client may ordinarily interact.

With particular reference now to FIG. 3, a test suite 502 may include one or more unit tests 504, each of which may correspond to a particular service with which the client may interact. Thus, the unit tests 504 may be relatively narrow in terms of their scope. More specifically, each service will have direct unit tests 504 which focus on the specific service and its expected behavior. These direct unit tests 504 communicate directly to the service interface, but the direct unit tests 504 do not have access to the implementation details.

The test suite 502 can also include unit tests 506 that can provide testing functionality at somewhat higher than a service level. For example, a unit test 506 may be configured to test an entire backup process, or a restore process. Both the backup and restore processes may involve multiple different services, as explained in detail in the 'Related Application' referenced herein. More specifically, the unit tests 506 communicate with higher level client objects and interfaces 508, which in turn use a service object to communicate with that service. In the unit tests 506, the test does not directly deal with a service class, but the service class functionality must be working properly in order for higher level processes to work.

Finally, the test suite 502 can include a test account fixture 510. In general, and as discussed in further detail elsewhere herein, the test account fixture 510 is a class that is instantiated in the context of many tests. The test account fixture 510 sets values into a mock context store 511 to represent a typical backup scenario, for example, with dummy information about the account that is being used and by setting default values that control how the service wrapper mock(s) 516 behave.

Communications from the unit tests 504, unit tests 506 and client code 508 can be directed to a service interface 512. For example, and as discussed in further detail below, the unit tests 506 and 504 can direct calls to network-based services by way of the service interface 512 although, as noted herein, no resulting network calls are transmitted to the actual service.

With continued attention to FIG. 3, it was noted earlier that a respective unit test can be employed for each service with which the client is expected to interact. Accordingly, a factory 514 is provided that can create a mock implementation of a particular service wrapper. The mock implementation can take the form of an object and may thus be referred to herein as a mock object. Moreover, the factory 514 can create the actual service wrapper as well. Creation of the mock service and the actual service interface can be implemented, for example, by using a configuration variable whose value can be set according to whether the mock service wrapper or the actual service wrapper is to be created. To illustrate, a mock implementation of a Service X may be referred to as the object 'Service X Wrapper Mock,' one example of which is denoted at 516. When not specifically referring to Service X, the object may be simply referred to as the service wrapper mock.

Each service wrapper mock can mock or simulate a different respective service. Thus, while FIG. 3 indicates only a single service wrapper mock 516, it should be understood that the client architecture 500 could include multiple service wrapper mocks 516, each corresponding to a different respective service. Service wrapper mocks 516 can be added to, and/or or removed from, the client architecture 500 as the mix of services associated with that client architecture 500 changes. In some embodiments at least, the addition or removal of one or more service wrapper mocks can be set to occur automatically in response to the addition or removal of a corresponding service to the cloud services 300. Additionally, or alternatively, one or more service wrapper mocks are added or removed manually in response to the addition or removal of a corresponding service to the cloud services 300. As further indicated in FIG. 3, the service wrapper mock 516 may interface with a set of response rules 518, and also implement response injection functionality using a response injector 520 as discussed in further detail below.

In general, each of the mock objects only simulates a respective service. Thus, the mock objects may cache values or even have local persistence. In some simple cases the mock objects can just have a completely hardcoded response to a call, but in other instances, the mock objects programmatically generate return values to a call based on their own current state. For example, a mock restore service implementation can track its own in-memory list of active restore jobs. As another example, the mock authentication service implementation may implement in-memory lists of valid account credentials and access tokens which do not have to correspond to real accounts and tokens in the actual authentication service. Thus, the mock objects never actually communicate with a network, such as the Internet. Moreover, the mock object may, in some instances at least, only need to simulate a subset of the full range of capability that the actual service implements. To illustrate, a mock object for an authorization service may need only deal with authentication requests related to a single client agent and may not need to address authorization service support for user administration, appliance registration or other functionalities that are not related to the client software.

With continued reference to FIG. 3, the service wrapper mock 516 can be thought of not only as mocking or simulating the actual client architecture code 550 that is to be tested, but also as acting like a web server by wrapping around that client architecture code 550 and intercepting calls directed to the client architecture code 550. In the illustrated example, the client architecture code 550 that is to be tested with one or more unit tests 504 may include a service wrapper 552, generated code 554, and a Representational State Transfer (REST) invoker 556. The REST invoker 556 can interface with an actual network-based service 600, such as a cloud service for example, by way of a curl library ('libcurl') 558. Additional and/or alternative components can be included as part of the client architecture code 550. Some or all of the client architecture code 550 can be written in C++ for example, although the scope of the invention is not limited to any particular language.

With reference first to the service wrapper 552, that component will, during normal operation of the client, receive service interface calls from other client code. For example, the service wrapper 552 may receive a call to download a file from a database, or restore a file to a target. In some example embodiments the service wrapper may make use of a library of generated code 554 which creates and interpreting HTTP requests and responses and JSON formatted strings necessary for communicating with the web service. The generated code 554 may be relatively low level code and may comprise, or consist of, application program interfaces (APIs) that may be automatically generated based on specifications for the service functionality published using the RESTful API Modeling Language (RAML) file format. In general, the generated code 554 can be considered as a so-called "stub" for communicating with the particular service with which the service wrapper 552 is associated. As noted above, the higher level code in the client that acts as a wrapper for the services capabilities may be written in C++, although that is not necessarily required.

Finally, a single instance of the REST Invoker class 556 is shared between all instances of the service wrappers 552. All network requests are passed to this object rather than going directly out to network from the service wrapper 552. In normal operation, the REST Invoker 556 will direct network requests to a network such as the internet via a HTTP library such as 'libcurl' 558. But, as discussed in further detail elsewhere herein, when running unit tests, the REST invoker 556 is generally configured to replace a network call with a prepared response that corresponds to how the server, to which the call would be directed, would respond in the normal course of operations. This process can be performed by way of the response injector 520. The prepared response can be determined and obtain through the use of the response rules 518. More particularly, when the REST invoker 556 receives a call, the REST invoker 556 can look up the call in the response rules 518 to determine what the response is that corresponds to that call. The REST invoker 556 can then return that response using the response injector 520. For example, a call might take the form "delete fileX." In this example, the fileX would not actually be deleted, but the REST invoker 556 would look in the response rules 518 for a rule along the lines of "if delete fileX, return resultY." The resultY would then be returned using the response injector 520. In some instances, a single service interface call may result in multiple requests and responses and, in such cases, all of the responses can be returned in sequence based on priority or other rules in the response rules 518.

As noted above, the service wrapper mock 516 can be thought of as mocking or simulating the actual client architecture code 550 that is to be tested. As such, the service wrapper mock 516 may act like a web server by wrapping around that client architecture code 550 and intercepting calls directed to the client architecture code 550.

With continued reference now to FIG. 3, further details are provided concerning the configuration and operation of the service wrapper mock 516 and associated client architecture code 550. As disclosed, service wrapper mock 516 is configured and arranged with respect to the service wrapper 552 such that the service wrapper mock 516 can intercept the interface calls made to the client architecture code 550 by the unit tests 504, yet still test the response of that client architecture code 550 to those interface calls. During normal operations, when calling an API on the service wrapper 552 object, a REST API call will be made using libcurl 558. But all REST API calls pass through the REST Invoker object 556 before being processed by code 554, such as generated stub code for example, and libcurl 558. As noted earlier, the REST Invoker 556 is configured by the service wrapper mock 516 to return a specific response, such as an HTTP Response for example, instead of making the actual call.

For example, when performing a lookup of agent info from an access service, the service wrapper mock 516, mock access code in this example, will set up an in-memory string with the JSON formatted agent info, and then create a rule saying that the next call to GET/iam/agent/{agentid} should return that string directly. The REST Invoker 556 will match that rule and inject that response. In this way, use of a generic rule API enables control of the behavior of the service as perceived by the client architecture code 550 that is to be tested and client code 508 at a relatively lower level of the client architecture code 550.

It should be noted that creation of the response to the interface call via a simulated network call, rather than simply returning the result directly, involves some amount of extra code. However, a benefit of this approach is that the test exercises the actual client architecture code 550, confirming the ability of that code to craft an expected REST API call and then to properly parse the generated response. The code generation and parsing processes can be implemented by way of the generated code 554.

As should be apparent, the service wrapper mock 516 may need information about expected responses. To illustrate, an authentication service may need to simulate a specific account and the configuration of that account. In order for the unit test 504 and the service wrapper mock 516 to confirm that expected values are flowing through the system, the unit test 504 and service wrapper mock 516 need to share the account information. For example the unit test 504 may set an expected Agent ID, but then perform a query for a different Agent ID and confirm that the call generates an exception. Thus, this requires that the service wrapper mock 516 know which Agent ID is "expected."

Information can be shared in various ways. For example, a relatively simple way to share information about the "expected" account would be to share an #include file with any number of #define statements. However a more flexible approach involves the use of a dynamic in-memory map of context information. A MockContext singleton can be configured by tests and then read by the mock objects. As used herein, a singleton class refers to a class that can have only one object, or instance of the class, at any one time. One result of this approach is there may be less hardcoded example data spread out through the operating environment. The main values shared between multiple unit tests 504 describe an example account performing a typical backup, and this is setup in the test account fixture 510 helper class.

In any event, the service wrapper mock 516 knows what values are "expected" because the service wrapper mock 516 looks up the key/values stored in the MockContext object. Those values may be set by the test account fixture 510 object at the unit test 504 level. One example of test code for this is as follows:

TestAccountConfig::TestAccountConfig( ) {
auto ctxt=Rufus::MockContext::instance( );
ctxt→set("config.responsecode", "200"/*HTTP::OK*/);
//Default response code
. . . //more calls to ctxt→set( )

To continue, when the TestAccountConfig is created, the TestAccountConfig clears any existing info in the Mock-Context, and then sets various values. In the preceding example, the TestAccountConfig sets a value to control the "Config" Mock object. The TestAccountConfig sets the response code that should be returned when the client attempts to download a client configuration document. By default, TestAccountConfig sets the value to 200, which is the standard HTTP success code. Any test that wants to use the Config server will typically run in an environment that has the TestAccountConfig already instantiated to set these defaults. Then the test itself may override that return code to adjust the behavior based on its specific test scenario. For example, a test that examines client behavior when the configure server is unavailable could override the default value and change it to "500" and then observe the expected error code or exception when it attempts to download the client configurations.

A further aspect of test support that is not specifically illustrated in FIG. 3 is the support for an authentication service. In this example, the REST Invoker 556 handles attachment of an authentication token to most calls. This token is retrieved via an authentication service (see, e.g., reference 302 in FIG. 1) and then cached. As a result, an interface call to any web service might result in one network call to the authentication service and another network call to the intended service. More generally, a single interface call can result in multiple network calls that correspond to the single interface call. Because token requests are made to a service, the configuration disclosed in FIG. 3 can also be applied in connection with such requests, and allows the possibility of a mock implementation of token retrieval by injection of a fake token response to avoid contact with the actual authentication service.

D. Example Test Methods

Figure 4:
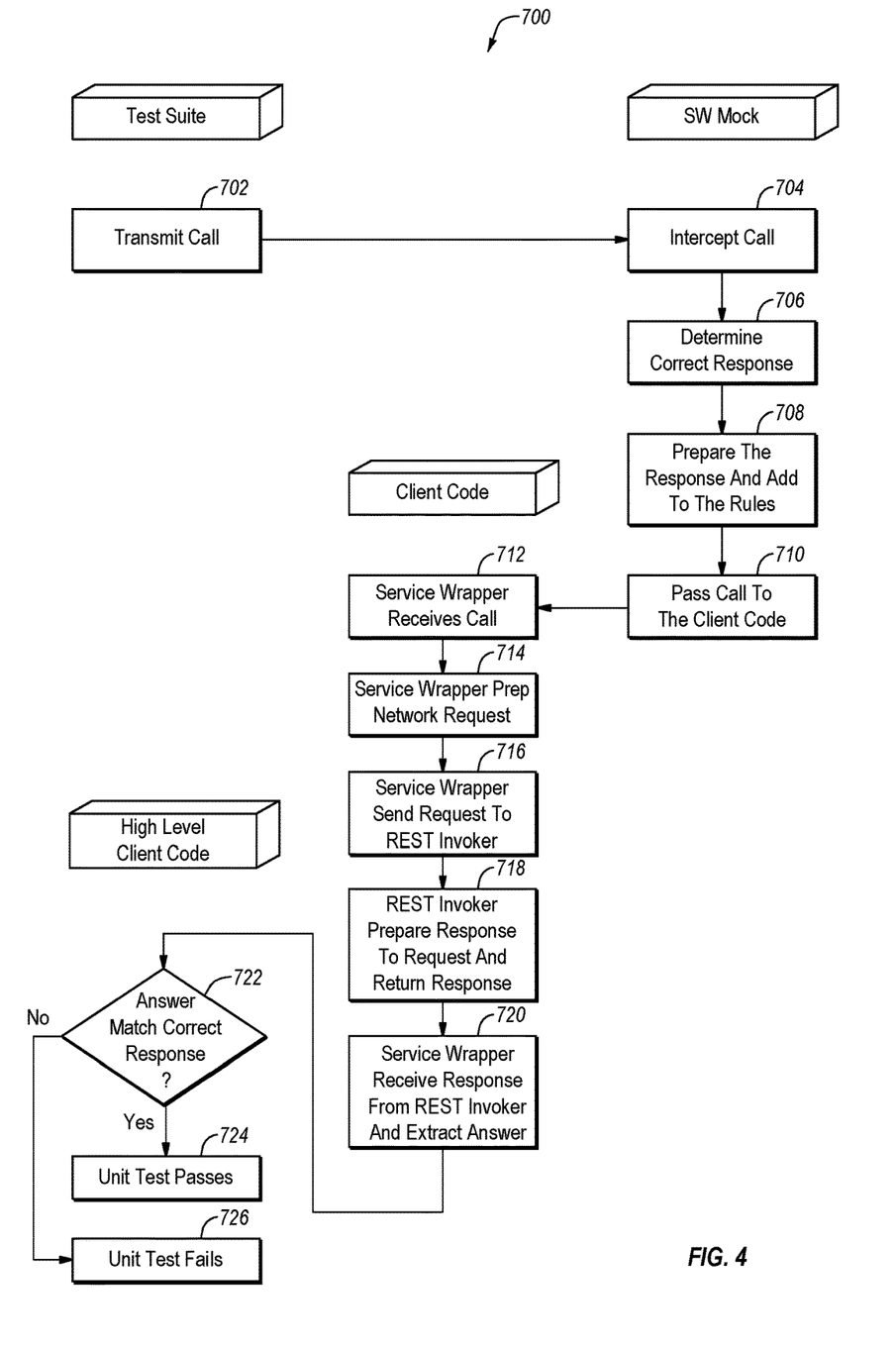
FIG. 4 is directed to an example method for testing client code.

With continued attention to FIG. 3, and directing attention now to FIG. 4, details are provided concerning testing methods, one example of which is denoted generally at 700. In general, each network-based service that may be accessed by the client is encapsulated such that a mock implementation of that service is provided, which then facilitates the creation of unit tests that exercise client code associated with that service.

The method 700 can begin at 702 where a unit test, which can correspond to any network-based service that may be accessed by a client, transmits an interface call 702 that during normal operations would be received by a service wrapper. The call can be any request for a network interface and can accordingly relate to any aforementioned network-based service hosted by a server. In the method 700 however, the call is not actually transmitted to, or received by, the network-based service. Rather, the call is intercepted 704 by a service wrapper mock that mimics the actual service wrapper. The service wrapper mock then determines 706 what the correct response should be, that is, the response that the server ordinarily would transmit in response to the call. This determination 706 can be made, for example, by examining a library or other local repository. Alternatively, the correct response can be prepared and stored by the service wrapper mock for later use. In any event, rather than returning the correct response, the service wrapper mock simply prepares 708 the response that would be generated by the server in response to the call that was initially made and adds that response 708 to a set of response rules. In at least some embodiments, the response is an HTTP response.

After the correct response to the call has been determined, the service wrapper mock then passes 710 the call to the real client architecture code (see, e.g., reference 550 in FIG. 3). The service wrapper of the client architecture code receives the call 712 and prepares a network request 714, such as an HTTP request, that corresponds to the call. The service wrapper then sends the network request 716 to the REST invoker (see, e.g., reference 556 in FIG. 3), but the network request is not sent to, nor received by, the actual network.

Thus, rather than making a real call to a network server, the REST invoker can then access the rules 718 to obtain the response that corresponds to the request, and then inject that response, rather than an actual server response. In some implementations, it may be the case that if the REST invoker does not find any rules pertaining to the network request that it has received 716, the request can be forwarded to an object, such as 'libcurl' for example, to make an actual network call.

Where an injected response is involved however, the injected response is then returned to the service wrapper. As noted earlier, this response may have been placed in the rules by the service wrapper mock. The service wrapper receives that response and extracts 720 the answer to the interface call 702. Next, an analysis can be performed to determine if the client code is operating properly or not.

In particular, the answer determined by the service wrapper can be passed to high level client code (see, e.g., reference 508 in FIG. 3) and a determination 722 can be made as to whether or not the response provided by the client code matches the correct response or not. For example, the answer extracted by the service wrapper can be compared with the correct response determined by the mock service wrapper. If the answer extracted by the service wrapper matches the correct response, then the unit test passes 724. On the other hand, if the answer extracted by the service wrapper does not match the correct response, then the unit test fails 726.

Thus, from the perspective of the client code, the client code has reached, that is, communicated with, the server or database to which the call was issued, and the client code has received a response to that call. In fact however, the client has never communicated over the network to a server or database, and the client code has been tested without the use of any actual network calls. If errors in the client code are identified, those can be corrected and the test re-run as necessary.

Concepts disclosed herein are now further illustrated with reference to some specific examples involving a network-based authorization service to which a client architecture, such as the example client architecture 500 disclosed in FIG. 3, may issue one or more calls. The following is an example implementation of an algorithm for mock authentication service "MockAuthenication::getAccessToken":

```
virtual void MockAuthenication::getAccessToken(
const std::string & clientId,
const std::string & clientSecret,
std::string & token)
{
auto ctxt=Rufus::MockContext::instance( );
if (clientId !=ctxt→get("agent.id")||
    clientSecret !=ctxt→get("agent.secret")) {
THROW_EXCEPTION(HTTP::InvalidResponseException(HTTP::FORBID DEN, "Wrong client/secret"));
}
//Force round trip through the real production code
DPC::API::IAM::TokenPOSTResp tokenResp;
tokenResp.access_token=ctxt→get("iam.token");
tokenResp.expires_in=3600;
m_restInvoker.installRule(
make_response(tokenResp.toString( )),
Request::POST,
std::string("/iam/oauth2/token"));
m_impl→getAccessToken(clientId, clientSecret, token);
}
```

This code is called to perform a REST api call to /iam/oath2/token to retrieve a new token. The client must authenticate with its clientID and clientSecret. In this code, the service wrapper mock, which can take the form of a mock object, simulates the server behavior of validating the clientID and clientSecret. If unexpected values are sent, the service wrapper mock will throw the same InvalidResponseException exception that would arise from the server (e.g. a 403 error). Note that when a developer is implementing the service wrapper and test code, this error behavior can be determined by referring to the API documentation for the web service, or by testing the actual authentication service and taking note of the resulting response to each request. In other words, the developer is responsible for making sure that the behavior of the mock service wrapper closely matches the behavior of the true web service.

Some test scenarios will cover the success case and others will explore the failure case. The service wrapper mock knows what values are "expected" because the service wrapper mock looks up the key/values stored in the Mock-Context object. Those values are set by the Test Account Fixture object (see, e.g., reference 510 in FIG. 3) at the unit test level (see, e.g., reference 504 and 506 in FIG. 3, and example test code below). If the test passes, the code can generate a "success" JSON response with the token.

Rather than build the JSON string by hand, a Token-POSTResp struct can be used that is generated from the authentication service's RAML file. This structure has a toString( ) method that converts the C++ members into the correct JSON formatted string. Note the value 3600 is hardcoded. This number could be converted to a dynamic value if needed.

Once the response is prepared, a rule is set to intercept the next call to /iam/oath2/token. The rule will expire after it is performed one time, so that this rule does not cause unexpected side effects in later unit tests. Application of the rule returns the successful response containing the iam.token value stored in the MockContext. Any other code that wants to confirm the expected token can compare the token that the code has with the same iam.token value. Once the rule is created, the normal production service wrapper code for retrieving the key (m_impl→getAccessToken) can be called. This code will prepare the request and then parse the response that was prepared in the service wrapper mock code. It should be noted that a more basic mock service wrapper could achieve the same behavior by simply returning ctxt→get("iam.token"). But the extra steps are performed so that the actual getAccessToken( ) implementation is tested, along with associated code such as the Token-POSTResp's toString method.

One particular embodiment of a test that covers getAccessToken may have the following form:

```
BOOST_AUTO_TEST_CASE(authentication_test)
{
HijackConfigVar forceMockAuthentication("mock.iam" "1");
RestInvokerFixture restInvoker;
auto auth=createAuthenicationServiceWrapper(restInvoker.m_invoker);
auto ctxt=Rufus::MockContext::instance( );
. . . test code removed . . .
//Look up a token
std::string token;
auth→getAccessToken(
ctxt→get("agent.id"),
ctxt→get("agent.secret"),
token);
BOOST_REQUIRE_EQUAL(token, ctxt→get("iam.token"));
```

In the above case, the success case is being tested, that is, where the provided clientId and clientSecret values match the same key/values in the MockContext that are read by the Mock implementation. Other test code could test the failure case by sending mismatched strings and then examining the expected exceptions.

E. Supplement—Further Example Embodiments

The following portion of this disclosure describes the technical design of some example unit test processes. In general, the tests can be written in C++ using the boost unit test framework. Thus, all the test code runs in the same process as the client code that is being tested.

A large part of the new code is the logic for talking to the new DPC services. The DPC services are REST APIs with their APIs defined using the RAML file format. Each call is performed over HTTP, with specific URLs, and often with HTTP Headers. The requests and responses typically comprise of data represented using JSON format. The low level portion of this code is generated by a tool called raml-util based on the RAML generation. This code acts like a "stub" for talking to the service. The higher level code is hand-written C++ in the Rufus client that acts like a Wrapper or Facade for the services capabilities. The C++ classes that wrap each service expose a clear interface to each service so that higher level code is encapsulated from the low level details of the network communication.

The services the client talks to are evolving on a continual basis and not always running reliably on our test networks. When running unit tests, there is a need to test the client in isolation and not actually talk to any real web services. In fact, in order to test a full range of scenarios, it is useful to force the client to react to a wide range of possible responses from those services, including error scenarios. One challenge is how to enable unit testing of the actual client code that talks to the DPC services.

There are several ways, all of which are within the scope of the present invention, to address this challenge.

Cloud on a box. The actual web service code could be run in a private test environment, perhaps directly on the developer machine. This may not be well suited for cases where the web services are highly dependent on a large infrastructure not intended to run on a single system and the overall system is changing so quickly that it may be difficult to maintain extra instances.

Mock web server. A local custom "test" web server will be used to stand in for the services. The client would connect to it on a localhost socket. The test server would return hardcoded HTTP responses based on the requested URL. This might be a small ruby or python program that reads response files from disk. One possible drawback to this approach is that this code runs as an external process outside the client process, so it is harder to have fine grained control over its behavior, especially when testing servers that have actual test code. Also, this approach involves a whole different set of ruby or python development and debugging skills that a C++ developer may not have.

In-proc Mock web server. At a low level, the HTTP or socket communication will be redirected to mock server code running in the same client. This approach may provide acceptable results but it requires some usual flexibility in the HTTP library and the mock code can be complex as it acts like a full-fledged HTTP server.

Mock at a higher level. Write classes that encapsulate the communication to each server and expose a clear interface, e.g. that acts like facade to the service. Then write another implementation of that interface that replaces the regular implementation. The new "mock" implementation simply simulates the behavior of the server without actually talking to the server at all. This works well for testing higher layers of the client, but may leave portions of client code untested because the real facade and stub code is not instantiated.

For the client ("Rufus), the above options can be considered, but other approaches may provide better results. The following discussion addresses aspects of one such alternative approach.

In brief, the solution is a blend of the "Mock at a higher level" and the "In-Proc Mock web server" approaches. Each service is encapsulated and a mock implementation is also provided. But in order to exercise the real implementation, each mock implementation actually simulates the real server by generating HTTP responses on demand. Some helpful shared code facilitates the mock server's work to generate these responses "on demand" and then inject them in place of real web service communication. The diagram disclosed in Appendix A, entitled "Rufus Test Suite", is an architecture diagram that provides further information. Appendix A is incorporated herein in its entirety by this reference.

The diagram shows one example of testing a class wrapping Service X. For example, DPC_Restore (service) which wraps the restore service, or DPC_Access with wraps the identity access management service. For the purpose of this diagram, the service is referred to generally as "X." The Service X wrapper classes take care of exposing the subset of the REST API that Rufus actually uses a C++ class. A focus of this design is to test those classes, and to a lesser degree to test the underlying dpcapi code (which is generated by raml-utils)

Each service will have direct unit tests which focus on the specific service and its expected behavior. These tests talk directly to the Service X interface but they do not have access to the implementation details. Other tests focus on higher level functionality, for example simulating a restore operation. These tests talk to higher level client objects and interfaces. which in turn use the Service X object to talk to that service. In those tests, the test does not directly deal with the service class, but that functionality must be working properly in order for higher levels to work.

Instances of the class are created using a factory. Normally the factory creates a regular DPC_X_Implementation object, but when the "Mock.X" configuration variable is set to true the factory will create a Mock implementation instead.

The Mock objects simulate the services, which means they may cache values or even have local persistence. In some simple cases, the mock objects may just have a completely hardcoded response, but normally they programmatically generate return values based on their own current state. For example, the Mock restore service implementation will need to track its own in memory list of active restore jobs. And the Mock Catalog object has to implement in-memory lists of previously backed up versions and savesets. These mock objects never actually talk to the internet or network and they only need to simulate the subset of scenarios that the tests are exploring. For example, for the Mock IAM service wrapper, the code only needs to deal with a single client ("Rufus") agent and does not need to worry about IAM support for user accounts, CloudBoost appliances.

The mock implementation wraps around the actual DPC_X_Implementation so that it can intercept the interface calls yet still exercise that code. Normally when calling an API on the DPC_X_implementation objects, a REST API call will be made using libcurl. But all REST API Calls pass through the RESTInvoker object before being processed by dpcapi code and libcurl. The RESTInvoker is configured by the Mock object to return a specific HTTP Response instead of making the real call.

For example, when doing a lookup of agent info from the Access service, the Mock Access code will set up an in memory string with the JSON formatted agent info, then create a rule saying that the next call to GET /iam/agent/{agentid} should return that string directly. The RESTInvoker will match that rule and inject that response. So using a generic rule API enables control of the behavior at a lower level of the software. Doing all the work to create the response as a string rather than just returning the result directly involves some extra code, but the benefit is that it ends up actually exercising the real DPC Service_X code, confirming its ability to craft an expected REST API call and then to properly parse the generated response. The generating and parsing happens with the help of the raml-util generated dpcapi code.

Meanwhile the Mock objects often need some information about expected data. For example, the access service will need to simulate a specific account and the configuration of that account. And the config service will need to return some specific Policy. In order for the test and the mock object to confirm that expected values are flowing through the system, they need to share this account info. For example, the test may set an expected Agent ID but then do a query for a different Agent ID and confirm that the call throws an exception—this requires that the mock service know which agentID is "expected."

One way to share info about the "expected" account would be to share an #include file with a lot of #define statements. However to give more flexibility, another approach involves use of a dynamic in memory map of context info. This MockContext singleton can be configured by tests and then read by the Mock objects. The result is that there is less hardcoded example data spread out. The main values shared between multiple unit tests describe an example account doing a typical backup, this is setup in the TestAccountFixture helper class (described in more detail below).

One reason for the use of dynamic configuration and C++ code to prepare the responses is because this gives the flexibility to simulate more versatile situations, including error handling. A test could simulate authentication errors by changing the expected token on the fly triggering failures at the Mock level.

Another aspect of this test support that is not shown in the diagram is the support for Authentication. The REST Invoker takes care of attaching an Authentication token to most requests. This token is retrieved via the DPCAccess service and then cached at the higher level AccessManager level. Most lower level unit tests such as the ones discussed here do not have the full Engine and AccessManager code active. So they use a fixture object to simulate the token requests and caching. Because tokens requests are a REST API then the design shown here actually applies to them also, with the possibility of a Mock implementation of Access injecting a fake token response to avoid contact to the real service.

Using these techniques should provide a high degree of test coverage of the code of the dpcservices project. There will also be better coverage for error scenarios that are difficult to simulate on the real services. And it will be possible to simulate new APIs even before the new versions of the services have been deployed.

The theory of the design can understood by looking at a typical example. Below is an example implementation of an algorithm for MockDPCAccessImpl::getAccessToken.

```
virtual void MockAuthentication::getAccessToken(
const std::string & clientId,
const std::string & clientSecret,
std::string & token)
{
auto ctxt=Rufus::MockContext::instance( );
if (clientId !=ctxt→get("agent.id")
clientSecret !=ctxt→get("agent.secret")) {
THROW_EXCEPTION(HTTP::InvalidResponseException(HTTP::FORBID DEN, "Wrong client/secret"));
}
//Force round trip through the real production code
DPC::API::IAM::TokenPOSTResp tokenResp;
tokenResp.access_token=ctxt→get("iam.token");
tokenResp.expires_in =3600;
m_restInvoker.installRule(
make_response(tokenResp.toString( )),
Request::POST,
std::string("/iam/oauth2/token"));
m_impl→getAccessToken(clientId, clientSecret, token);
}
```

This code is called to perform a REST api call to /iam/oauth2/token to retrieve a new token. The client must authenticate with its clientID and clientSecret. In this code, the mock object simulates the server behavior of validating the clientID and clientSecret. If unexpected values are sent, it will throw the same InvalidResponseException exception that would arise from the server (e.g. a 403 error). (This error behavior was determined by testing the actual IAM server and taking note in the logs of the resulting response). Some test scenarios will cover the success case and others will explore the failure case.

The Mock server knows what values are "expected" because it looks up the key/values stored in the MockContext object. Those values are set by the TestAccountFixture object at the Unit Test level (see example test code below). If that passes, the code will generate a "success" JSON response with the token and its expiry time. Rather than build the JSON string by hand we use a struct TokenPOSTResp that is generated by raml-util from IAM service's RAML file. This structure has a toString( ) method that converts the C++ members into the correct JSON formatted string. Note the value 3600 is hardcoded. This is not an important number in the testing and client functionality, but it could be converted to a dynamic value if needed.

Once the response is prepared we set a rule to intercept the next call to /iam/oath2/token. The rule will expire after it is performed one time, so that this rule does not cause unexpected side effects in later unit tests. It returns the successful response containing the iam.token value stored in the MockContext. Any other code that wants to confirm the expected token can compare the token they have with the same iam.token value.

Once the rule is created, the normal production code for retrieving the key (m_impl→getAccessToken) can be called. It will prepare the request and the parse the response that we had prepared in the mock object code. A relatively simple version of this Mock implementation simpler returns ctxt→get("iam.token"). As a first step that is better than nothing, but the extra processes are performed here intentionally so that the actual getAccessToken( ) implementation is tested, along with associated structs like TokenPOSTResp.

One actual test algorithm that covers getAccessToken can look like this:

```
BOOST_AUTO_TEST_CASE(authentication_test)
{
HijackConfigVar forceMockAuthentication("mock.iam", "1");
RestInvokerFixture restInvoker;
auto auth=createAuthenicationServiceWrapper(restInvoker.m_invoker);
auto ctxt=Rufus::MockContext::instance( );
. . . test code removed . . .
//Look up a token
std::string token;
auth→getAccessToken(
ctxt→get("agent.id"),
ctxt→get("agent.secret"),
token);
BOOST_REQUIRE_EQUAL(token, ctxt→get("iam.token"));
```

In the above case, the code is testing the success case, where the provided clientId and clientSecret values match the same key/values in the MockContext that are read by the Mock implementation. Other test code would test the failure case by sending mismatched strings and catching the expected exceptions.

Attention is now directed to communications between tests and Mock Objects using MockContext and TestAccountConfig. One of the primary ways to communicate is via the Mock Context. The MockContext by default is completely empty of any information. The TestAccountFixture is a class that is instantiated in the context of many tests. Often it is created automatically for all tests of a suite, for example: BOOST_FIXTURE_TEST_SUITE(DPCDownloadSuite, TestAccountConfig). This sets many values into the Mock-Context to represent a typical backup scenario, e.g. with "fake" information about the account that is being used and setting default values that control how the MockServers behave.

Below is an example from the code:
TestAccountConfig::TestAccountConfig( )
{
auto ctxt=Rufus::MockContext::instance( );
ctxt→clearQ;
. . .
ctxt→set("config.responsecode", "200"/*HTTP::OK*/);
//Default response code
. . .

When the TestAccountConfig is created it clears any existing info in the MockContext, and then sets a large number of values. In above example, a value is set to control the "Config" Mock object. As well, the response code that should be returned when the client attempts to download config. is set. By default, the value is to 200, which is the standard HTTP success code.

Any test that wants to use the Config server can run in an environment that has the TestAccountConfig already instantiated to set these defaults. Then the test itself may override that return code to adjust the behavior based on its specific test scenario. Note that although only strings are supported as the value type for each key, it is possible to record sophisticated data inside the MockContext by using JSON formatted strings. For example, when testing events the entire event structure is recorded inside the mock context.

For more advanced configurations, the Mock object may need to expose its own "custom" interface and tests will have a way to access it so they can do more sophisticated configuration. Many testing processes can perform acceptably with the key/value map, especially considering that the contents of the map can be dynamic during the test. Use of custom headers can be problematic in some instances since, during high level tests, it is not always trivial to get a pointer to the Mock implementation.

For testing multi-threading scenarios, the mock objects can be written to check for SyncPoints. This makes it easy to stop the execution at a very specific point. SyncPoints are sometimes placed in the production code as well because they have no overhead when not enabled in testing mode.

Following is a discussion of an analogy that helps to illustrate further some of the testing and related concepts disclosed herein. The analogy concerns processes that may be performed at a bank and/or post office.

The analogy begins with a bank that gives mortgages. The customer fills in a simple application form with Name, Income, Assets and mails it to the local bank. Normally the application goes directly to the bank employee, who fills in a more detailed internal application form that includes info about the customer. The internal application is given to the bank mail room who send it to the central office. The central office reviews the application and return a response form that denies the mortgage or describes the mortgage terms. The bank employee reads this response and then calls the customer to describe the result in layman's terms.

Now suppose the bank wants to test parts of the system. The bank might want to test their bank employee to make sure that they can properly prepare these forms, and properly understand the responses from the central office and communicate that properly back to the customer. They also might want to test how customers will react given different offers from the bank.

When testing this, the bank does not want the central office to be involved. The bank also does not want the bank employee to have any disruption or change from his or her normal behavior. And, the bank wants minimal disruption in the normal operation of the bank.

The bank hires a test supervisor who performs the testing by sending a tester to the bank with instructions for different scenarios to test, and prepare some example customer applications which get mailed in just like real applications. In some cases the test supervisor acts as the customer, and directly prepares the applications and expects a direct phone call with the results. In other cases, the test supervisor was to test real customer reactions so he recruits people to make applications and then interviews them after to see if things went smoothly.

When a customer application arrives at the bank, the onsite tester takes the simple application form and looks at it. The tester knows how to create a "fake" response from the central bank, to either accept or deny the application. The tester checks her instructions for the day, which might say to deny all applications. The tester then prepares the response and labels it with the name of the customer and she gives that to the bank mail room. Then she gives the simple application to the regular bank employee. The bank employee treats it like any other regular customer application and prepares the detailed application form and gives that to the mail room.

The mail room sees that there is already a response prepared for that customer, so instead of mailing the request to the central office they just give the response to the employee immediately. The employee reads the response and then phones the customer with the results. The onsite tester does not interfere at this stage. Depending on the stage of the testing the customer might actually be the test supervisor or it might be a customer hired by the bank.

If the employee successfully handles a wide range of applications and different possible application outcomes and reports the results properly to the customers then the employee is considered to be a good employee, but the employee is retested on a regular basis to make sure. Because this happens on a regular basis, the bank and bank mail room are used to the tester being present part of the time.

To complete the analogy, the map disclosed in Appendix A, entitled "Test Supervisor", correlates the above scenario to the components in the diagram:

Test supervisor="rufustests" suite of unit tests
Test instruction (e.g. "deny all requests today")=Mock context
Simple Application=Request to DPC Service Interface, e.g. API with simplified interface like getMortgage (name=Joe,salary=5000,assets=−10000)
Onsite tester=Mock DPC Service X Facade
Whether onsite tester is at the bank that day=Factory object (described more below)
Bank Employee=DPC Service X+DPCAPI layers, e.g. the code being tested
Internal Application to Central=HTTP Request intended for DPC service in the cloud
Application response from Central=HTTP Response, normally from DPC service but possible created by onsite tester
Bank mail room=REST Invoker object
Bank Central Office=DPC Service in the cloud
Phone Call=Response to the Simple Application call.

Postal service=libcurl (not involved when testing)

Customer=higher level code.

To briefly continue with the aforementioned analogy, when the test supervisor is testing the employee more directly, the test supervisor can fill in for the customer. This is like the direct unit test case. But when testing customer satisfaction and reaction, the test supervisor hires actual people and then interviews them. This analogous to using the system to test higher levels of the code to see how it reacts with different behaviors.

This same design can be used to test other similar processes at the bank, such as car loans, credit cards and the like. The test supervisor has a different lists of scenarios to try out, and the forms and employee are different, but the overall technique is the same.

With reference to the preceding diagram, the "Factory" object creates mock objects to wrap the regular object if a certain global setting is enabled, otherwise it creates the regular object directly. Similarly, if the onsite tester is present in the bank, she takes all the incoming customer applications. If she is not there, then it goes directly to the regular bank employee.

It should be noted that while the disclosure herein may refer from time to time to specific components, code, implementations, processes and the like, the scope of the invention is not limited to those specific illustrations. More generally, the disclosure herein applies to any design for testing code that talks to a web service.

The idea of encapsulating access to a particular web service behind an interface, such as a C++ interface for example, makes it possible to inject a mock server. As long as all the REST API calls are handled using a centralized library, and there is a way to manage a few centralized in-memory structures (for rules and context), then the same sort of solution could be recreated in other software solutions. In other words, there just needs to be a way to funnel all calls to "RestInvoker" object and that makes it possible to intercept the calls before the reach the underlying HTTP library. As a final note, it is disclosed herein that the client ("Rufus") employs a combination of hand-written service wrapper and raml-util generated code. However, such a combination is not required. Moreover, there could be one or more layers of code between the interface and the underlying "REST invoker."

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods, or portions thereof, disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, and on-premises storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions, examples of which include the functions disclosed herein. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for testing operation of a client, comprising:
transmitting, by a unit test that corresponds to a particular network-based service with which the client is expected to interact, an interface call, wherein the interface call is a simulated interface call, and wherein the unit test is configured to test client interaction with the network-based service;

intercepting the interface call with a mock service wrapper that mimics actual client architecture code and simulates operation of a web server;

determining a correct response to the interface call, wherein the correct response is a response that would ordinarily be transmitted by an actual service wrapper in response to the interface call;

passing the interface call from the mock service wrapper to the actual service wrapper;

intercepting a network request when the network request is sent by the actual service wrapper, wherein the intercepted network request corresponds to the interface call that was passed by the mock service wrapper to the actual service wrapper;

injecting a previously prepared response that corresponds to the network request;

extracting, from the previously prepared response, an answer to the interface call;

comparing the answer to the correct response; and generating a unit test success indication when the answer matches the correct response, and generating a unit test failure indication when the answer does not match the correct response.

2. The method as recited in claim 1, wherein the method is performed without any communication between the client and a network.

3. The method as recited in claim 1, wherein the method is performed entirely within an architecture of the client.

4. The method as recited in claim 1, wherein the simulated interface call simulates an actual interface call that is transmitted, during normal operations, by the client to the network-based service.

5. The method as recited in claim 1, further comprising storing the correct response.

6. The method as recited in claim 1, wherein determining the correct response is performed by the mock service wrapper.

7. The method as recited in claim 1, wherein the network request is prepared by the actual service wrapper.

8. The method as recited in claim 1, wherein the mock service wrapper resides at the client and does not communicate with a network.

9. The method as recited in claim 1, wherein the actual service wrapper is configured for communication with a network.

10. The method as recited in claim 1, wherein the network request is prepared by a REST invoker associated with the actual service wrapper.

11. The method as recited in claim 1, wherein the answer is obtained by the actual service wrapper.

12. A non-transitory storage medium having stored therein computer-executable instructions which, when executed by one or more hardware processors:

perform the following processes at a client:

transmitting, by a unit test that corresponds to a particular network-based service with which the client is expected to interact, an interface call, wherein the interface call is a simulated interface call, and wherein the unit test is configured to test client interaction with the network-based service;

intercepting the interface call with a mock service wrapper that mimics actual client architecture code and simulates operation of a web server;

determining a correct response to the interface call, wherein the correct response is a response that would ordinarily be transmitted by an actual service wrapper in response to the interface call;

passing the interface call from the mock service wrapper to the actual service wrapper;

intercepting a network request when the network request is sent by the actual service wrapper, wherein the intercepted network request corresponds to the interface call that was passed by the mock service wrapper to the actual service wrapper;

injecting a previously prepared response that corresponds to the network request;

extracting, from the previously prepared response, an answer to the interface call;

comparing the answer to the correct response; and generating a unit test success indication when the answer matches the correct response, and generating a unit test failure indication when the answer does not match the correct response.

13. The non-transitory storage medium of claim 12, wherein the processes are performed without any communication between the client and a network.

14. The non-transitory storage medium of claim 12, wherein the processes are performed entirely within an architecture of the client.

15. The non-transitory storage medium of claim 12, wherein the simulated interface call simulates an actual interface call that is transmitted, during normal operations, by the client to the network-based service.

16. The non-transitory storage medium of claim 12, wherein:

wherein determining the correct response is performed by the mock service wrapper; and the network request is prepared by the actual service wrapper.

17. The non-transitory storage medium of claim 12, wherein the answer is obtained by the actual service wrapper.

18. A computing device, comprising:

one or more hardware processors; and the non-transitory storage medium as recited in claim 12.

* * * * *